(12) United States Patent
Wang et al.

(10) Patent No.: US 6,636,667 B2
(45) Date of Patent: Oct. 21, 2003

(54) TUNABLE OPTICAL FIBER GRATING PACKAGE WITH LOW TEMPERATURE DEPENDENCY

(75) Inventors: Qinglin Wang, San Jose, CA (US); Weiti Wu, Milpitas, CA (US)

(73) Assignee: Oplink Communications Inc., San Jose, CA (US)

( * ) Notice: Subject to any disclaimer, the term of this patent is extended or adjusted under 35 U.S.C. 154(b) by 0 days.

(21) Appl. No.: 10/006,789

(22) Filed: Dec. 6, 2001

(65) Prior Publication Data

US 2003/0108287 A1 Jun. 12, 2003

(51) Int. Cl.⁷ .............................. G02F 1/035; G02B 6/00; G02B 6/34; C03C 10/14; C03C 10/12
(52) U.S. Cl. ............................ 385/37; 385/2; 385/13; 501/4; 501/7
(58) Field of Search ............................ 385/37, 2, 13; 501/4, 7

(56) References Cited

U.S. PATENT DOCUMENTS

| | | | |
|---|---|---|---|
| 5,042,898 A | * 8/1991 | Morey et al. | 385/37 |
| 5,694,503 A | * 12/1997 | Fleming et al. | 385/37 |
| 5,841,920 A | 11/1998 | Lemaire et al. | 385/37 |
| 5,987,200 A | * 11/1999 | Fleming et al. | 385/37 |
| 6,108,470 A | * 8/2000 | Jin et al. | 385/37 |
| 6,144,789 A | 11/2000 | Engelberth et al. | 385/37 |
| 6,181,851 B1 | 1/2001 | Pan et al. | 385/37 |
| 6,233,382 B1 | 5/2001 | Olson et al. | 385/37 |
| 6,240,220 B1 | 5/2001 | Pan et al. | 385/13 |
| 6,356,683 B1 | * 3/2002 | Hu et al. | 385/37 |
| 6,362,118 B1 | * 3/2002 | Beall et al. | 501/7 |
| 6,377,727 B1 | * 4/2002 | Dariotis et al. | 385/37 |
| 6,403,511 B2 | * 6/2002 | Fleming et al. | 501/102 |
| 6,411,746 B1 | * 6/2002 | Chamberlain et al. | 385/2 |
| 6,490,931 B1 | * 12/2002 | Fernald et al. | 73/705 |
| 6,492,288 B2 | * 12/2002 | Shindo | 501/4 |

\* cited by examiner

*Primary Examiner*—Brian Healy
*Assistant Examiner*—Tina M Lin
(74) *Attorney, Agent, or Firm*—Lumen Intellectual Property Services (57) ABSTRACT

A tunable optical fiber grating package with a supporting assembly and an optical fiber portion having at least one grating between a first end and a second end of the fiber portion is provided. The first end and the second end of the fiber portion define a longitudinal direction and the at least one grating has an optical characteristic that varies with strain of the fiber portion. The supporting assembly has a first supporting member formed of a material having ultra low CTE, a second supporting member formed of a material having a negative CTE and a tuning means for changing the dimension of the first supporting member substantially along the longitudinal direction. The first supporting member and the second supporting member are bonded together. The first end and the second end of the fiber portion are fixed on the supporting assembly such that the optical characteristic of the grating is tunable by the tuning means and effect of temperature fluctuations on the fiber portion is substantially compensated by the second supporting member.

39 Claims, 4 Drawing Sheets

TUNABLE OPTICAL FIBER GRATING PACKAGE WITH LOW TEMPERATURE DEPENDENCY

FIELD OF THE INVENTION

The present invention relates generally to fiber optic communication devices, and in particular to a tunable optical fiber grating package with low temperature dependency.

BACKGROUND OF THE INVENTION

Optical gratings are becoming more and more important for selectively controlling specific wavelengths of light transmitted within optical communication systems. Various fiber Bragg gratings (FBG) are a particularly advantageous group of gratings for manipulating optical signals based on their wavelengths. A fiber Bragg grating is generally fabricated by exposing a photosensitive fiber to UV light thereby creating a permanent refractive-index grating along the core of a fiber.

It is familiar to those skilled in the art that the Bragg wavelength $\lambda$ of a fiber Bragg grating is related to the period ($\Lambda$) of the fiber Bragg grating and the effective index of refraction ($n_{eff}$) as shown in equation (1):

$$\lambda = 2n_{eff}\Lambda \tag{1}$$

The effective index of refraction $n_{eff}$ of the fiber varies significantly over an expected working temperature range of, e.g. $-20°$ C. to $80°$ C., mainly due to the thermal expansion of the fiber material-itself and the temperature dependency of the fiber's effective index of refraction $n_{eff}$. Over this expected working temperature range, the grating wavelength shifting of an uncompensated 1550 nm grating can exceed 1 nm which is not acceptable to an optical communication system.

In equation (1), both the period $\Lambda$ of the fiber Bragg grating and the effective index of refraction $n_{eff}$ vary with temperature. The wavelength $\lambda$ can be changed by changing the effective index of refraction $n_{eff}$ or changing the period $\Lambda$ of the fiber Bragg grating. This principle has been used to develop various devices to compensate wavelength shifting of fiber grating mainly through adjusting the strain applied in the optical fiber.

From equation (1), following equation (2) can be qualitatively derived:

$$d\lambda/\lambda = dn_{eff}/n_{eff} + d\Lambda/\Lambda \tag{2}$$

According to equation (2), it is apparent to those skilled in the art that the wavelength $\lambda$ of a fiber Bragg grating can be changed by changing the effective index of refraction $n_{eff}$ and/or by changing the period $\Lambda$. Up to now, the method by changing the effective index of refraction $n_{eff}$ is relatively expensive and difficult to achieve. Thus a preferred method is to vary the period $\Lambda$ so as to tune the wavelength of a fiber grating. The period of a fiber Bragg grating is generally varied by stretching, compressing or deforming the fiber. If the effective index of refraction $n_{eff}$ is kept constant, the changing of the period of the fiber Bragg grating is proportional to the changing of length of the fiber portion in which the fiber Bragg Grating is written. Unfortunately, the effective index of refraction $n_{eff}$ in equation (2) is not constant over an expected temperature range. Therefore after tuning a fiber Bragg grating to an expected wavelength by changing the period, this wavelength is subject to shifting and needs to be compensated against temperature variation.

U.S. Pat. No. 5,042,898 discloses a temperature compensated fiber Bragg device having a fiber portion with two ends. Each end of the fiber portion is attached to a different one of two compensating members made of materials with different positive Coefficients of Thermal Expansion (CTE) relative to one another such that the longitudinal strain applied to the fiber varies with temperature in such a manner that the changes in the central wavelength that are attributable to the changes in the longitudinal strain substantially compensate for those attributable to the changes in the temperature of the grating. This device is relatively complicated and is not suitable for temperature compensation of a tunable device with more than one central wavelength.

U.S. Pat. No. 5,841,920 discloses a similar temperature compensating optical wave-guide device having two supporting components with two different positive Coefficients of Thermal Expansion (CTE). This prior art reference teaches that a single compensating member is not practical since a material possessing the required expansion coefficient properties is not commonly known or readily available (column 1, lines 62–65). This teaching is generally not consistent with the present technical possibilities in the art.

The devices disclosed in U.S. Pat. Nos. 6,144,789 and 6,181,851 also use two supporting components with two different positive Coefficients of Thermal Expansion (CTE). These devices are also not suitable for temperature compensation of a tunable package with more than one central wavelength.

U.S. Pat. No. 6,233,382 teaches a thermal compensating package for an optical fiber Bragg grating having a supporting member which is formed of a composite structure having a first material with a first negative CTE in one direction and a second material with a second CTE in another directions which is different from that of the first CTE. The composite structure is formed of two types (e.g. polymer fibers and carbon fibers) of fibers embedded in an epoxy resin. This device is generally not suitable for temperature compensation of a tunable fiber package. This prior art reference also teaches that it is particularly difficult to provide one single negative CTE material that precisely compensates for temperature variations of a fiber package (column 2, lines 6–9). This teaching is also generally not consistent with the present technical possibilities in the art.

U.S. Pat. No. 6,240,220 teaches a tunable optical fiber grating package which can cause a change in the center wavelength of a fiber Bragg grating. The package provides a controlled and predetermined change in wavelength response by subjecting a fiber portion having a fiber Bragg grating written therein to a controlled strain. The strain in the fiber is induced by varying a longitudinal displacement of a support member which supports the fiber. A PZT actuator is used to linearly displace the fiber support member. Unfortunately, this tunable optical fiber grating package itself has a relatively high temperature dependency due to following reasons:

The support member of the package is made of brass, stainless steel, aluminum, Cu/Be alloy or the like. These materials have relatively high positive CTE and cause the longitudinal displacement of the support member to vary with temperature; and The supporting member of the package includes a magnification structure with a mechanical advantage between 5 and 15. The variation of the longitudinal displacement of the support member caused by the CTE of the PZT actuator itself is also magnified to an unacceptable amount, e.g. 5 times to 15 times larger than the thermal dimensional variation of the PZT actuator itself.

In view of the above, it would be an advance in the art to provide a tunable optical fiber grating package with low temperature dependency.

OBJECTS AND ADVANTAGES

It is a primary object of the present invention to provide a tunable optical fiber grating package with low temperature dependency having a first supporting member being formed of a material having ultra low CTE and a second supporting member being formed of a material having a negative CTE. The optical characteristic that varies with strain of the fiber portion, e.g. the wavelength of a Bragg grating, is tunable by changing the dimension of the first supporting member along the longitudinal direction of the fiber by a tuning means. The effect of temperature fluctuation on the fiber grating can be substantially compensated by the second supporting member.

It is another object of the present invention to provide a tunable optical fiber grating package with low temperature dependency having an optical fiber portion having at least one grating between a first end and a second end of the fiber portion. The first end and the second end of the fiber portion are fixed on the first supporting member and the second supporting member respectively.

It is yet another object of the present invention to provide a tunable optical fiber grating package with low temperature dependency having an optical fiber portion having at least one grating between a first end and a second end of the fiber portion. Both the first end and the second end of the fiber portion are fixed on the second supporting member.

It is yet another object of the present invention to provide a tunable optical fiber grating package with low temperature dependency having a first supporting member with an inverse magnification structure (mechanical advantage smaller than 1) that can substantially eliminate the influence of the thermal dimensional variation of the tuning means, e.g. a PZT actuator.

It is yet another object of the present invention to provide a tunable optical fiber grating package with low temperature dependency having a first supporting member being formed of a material having ultra low CTE, a third supporting member being formed of a material having ultra low CTE and a second supporting member being formed of a material having a negative CTE. The optical characteristic that varies with strain of the fiber portion, e.g. the wavelength of a Bragg grating, is tuned by changing the dimension of the first, the third supporting members along the longitudinal direction of the fiber by a first and a second tuning means. The effect of temperature fluctuation on the fiber grating can be substantially compensated by the second supporting member.

It is yet another object of the present invention to provide a tunable optical fiber grating package with low temperature dependency having a first supporting member being formed of a material having ultra low CTE, a second supporting member being formed of a material having negative CTE and a third supporting member being formed of a material having a negative CTE. The optical characteristic that varies with strain of the fiber portion, e.g. the wavelength of a Bragg grating, is tuned by changing the dimension of the first supporting members along the longitudinal direction of the fiber by a tuning means. The effect of temperature fluctuation on the fiber grating can be substantially compensated by the second and third supporting members.

By the unique combination of at least one dimension-controllable supporting member being formed of a material having ultra low CTE for tuning and at least one supporting member being formed of a material having a negative CTE for temperature compensation, the tunable optical fiber grating package with low temperature dependency can be used over a predetermined wavelength tuning range for most applications, such as dense wavelength division multiplexing (DWDM) wavelengths latch, reconfigurable optical add/drop multiplexing (OADM), dispersion compensation, tunable fiber laser sources and network channel monitoring and so on. The optical fiber grating package of the present invention is also relatively cost effective and simple in structure.

These and numerous other objects and advantages of the present invention will become apparent upon reading the detailed description.

SUMMARY

According to the present invention, there is provided an optical fiber grating package which has a supporting assembly and an optical fiber portion having at least one grating between a first end and a second end of the fiber portion. The first end and the second end of the fiber portion define a longitudinal direction and the at least one grating has an optical characteristic that varies with strain of the fiber portion. The supporting assembly of the optical fiber grating package has a first supporting member being formed of a material having ultra low CTE, a second supporting member being formed of a material having a negative CTE; and a first tuning means for changing the dimension of the first supporting member substantially along the longitudinal direction.

The first supporting member and the second supporting member are bonded together. The first end and the second end of the fiber portion are fixed on the supporting assembly such that the optical characteristic of the grating is tunable by the first tuning means and effect of temperature fluctuations on the strain is substantially compensated by the second supporting member.

The at least one grating includes a plurality of fiber Bragg gratings. Each grating can be a grating selected from a group consisting of even-period grating and uneven-period grating. The optical characteristic includes a characteristic selected from a group consisting of a wavelength of a fiber Bragg grating, a resonant wavelength of Bragg gratings, a change in strain inducing a change in the resonant wavelength of in the fiber portion, and a change in strain within a predetermined range of strain.

In accordance with one aspect of the present invention, the first end of the fiber portion of the optical fiber grating package is fixed on the first supporting member and the second end of the fiber portion is fixed on the second supporting member.

The first supporting member can have an inverse magnification structure with a mechanical advantage smaller than 1 that transfers a displacement of the first tuning means into a change in strain of the fiber portion. In one example of the present invention, the mechanical advantage of the inverse magnification structure is smaller than ½.

The first supporting member can further have a first fiber holder for fixing the first end of the fiber portion, and the second supporting member can have a second fiber holder for fixing the second end of the fiber portion.

The absolute value of the ultra low CTE of the first supporting member is smaller than $2*10^{-6}/°$ C. The first supporting member can be made of invar or similar materials with ultra low CTE. The negative CTE of the second supporting member is substantially between $-7*10^{-6}/°$ C. to $-14*10^{-6}/°$ C. The second supporting member can be made of high negative CTE ceramic composite or similar materials.

The second supporting member supports a predetermined portion of the fiber portion between the first end and the second end of the fiber portion such that the effect of temperature fluctuations on the strain is substantially compensated by the second supporting member.

The first tuning means can have a PZT actuator. The absolute CTE value of the PZT actuator is preferably not larger than $2*10^{-6}/°$ C. The first tuning means can also have a servo step motor. The first supporting member can further have a differential screw structure made of the same material as that of the first supporting member. The first supporting member can also have a worm/worm wheel subassembly which can be disposed between a differential screw structure and a servo step motor.

The first supporting member of the optical fiber grating package can also have a magnification structure with a mechanical advantage larger than 1. This is especially preferred when the first tuning means has an ultra-low thermal influence on the dimensional displacement of the first supporting member along the longitudinal direction of the fiber portion. For example, a servo step motor can be used to drive a differential screw structure made of the same ultra low CTE material (e.g. invar) as that of the first supporting member. This configuration can substantially raise the wavelength tuning range.

In accordance with another aspect of the present invention, both the first end and the second end of the fiber portion of the optical fiber grating package are fixed on the second supporting member which is bonded to the first supporting member.

The first supporting member can have an inverse magnification structure with a mechanical advantage smaller than 1 that transfers a displacement of the first tuning means into a change in strain of the fiber portion. In one example of the present invention, the mechanical advantage of the inverse magnification structure is smaller than ½. The second supporting member can further have a first fiber holder for fixing the first end of the fiber portion, and a second fiber holder for fixing the second end of the fiber portion.

The absolute value of the ultra low CTE of the first supporting member is smaller than $2*10^{-6}/°$ C. The first supporting member can be made of invar or similar materials with ultra low CTE. The negative CTE of the second supporting member is substantially between $-7*10^{-6}/°$ C. to $-14*10^{-6}/°$ C. The second supporting member can be made of high negative CTE ceramic composite or similar materials.

The second supporting member supports a predetermined portion of the fiber portion between the first end and the second end of the fiber portion such that the effect of temperature fluctuations on the strain is substantially compensated by the second supporting member.

The first tuning means can have a PZT actuator. The absolute CTE value of the PZT actuator is preferably not larger than $2*10^{-6}/°$ C. The first tuning means can also have a servo step motor. The first supporting member can further have a differential screw structure made of the same material as that of the first supporting member. The first supporting member can also have a worm/worm wheel subassembly which can be disposed between a differential screw structure and a servo step motor.

The first supporting member of the optical fiber grating package can also have a magnification structure with a mechanical advantage larger than 1. This is especially preferred when the first tuning means has an ultra-low thermal influence on the dimensional displacement of the first supporting member along the longitudinal direction of the fiber portion. For example, a servo step motor can be used to drive a differential screw structure made of the same ultra low CTE material (e.g. invar) as that of the first supporting member. This configuration can substantially raise the wavelength tuning range.

In accordance with yet another aspect of the present invention, besides the first supporting member being formed of a material having ultra low CTE, the second supporting member being formed of a material having a negative CTE and the first tuning means for changing the dimension of the first supporting member substantially along the longitudinal direction, the supporting assembly of the optical fiber grating package further has a third supporting member being formed of a material having ultra low CTE and a second tuning means for changing the dimension of the third supporting member substantially along the longitudinal direction.

The first supporting member, the third supporting member are bonded with the second supporting member respectively. The first end and the second end of the fiber portion are fixed on the first and third supporting members respectively such that the optical characteristic of the grating is tunable by the first tuning means and the second tuning means, and effect of temperature fluctuations on the strain is substantially compensated by the second supporting member. Each of the first tuning means and the second tuning means can have a tuning means selected from a group consisting of servo step motor and PZT actuator.

In accordance with yet another aspect of the present invention, besides the first supporting member being formed of a material having ultra low CTE, the second supporting member being formed of a material having a negative CTE and the first tuning means for changing the dimension of the first supporting member substantially along the longitudinal direction, the supporting assembly of the optical fiber grating package further has a third supporting member being formed of a material having ultra low CTE and a second tuning means for changing the dimension of the third supporting member substantially along the longitudinal direction.

The first supporting member, the second supporting member and the third supporting member are bonded together along the longitudinal direction with the second supporting member in the middle, the first end and the second end of the fiber portion are fixed on the first and third supporting members respectively such that the optical characteristic of the grating is tunable by the first tuning means and the second tuning means, and effect of temperature fluctuations on the strain is substantially compensated by the second supporting member. Each of the first tuning means and the second tuning means can have a tuning means selected from a group consisting of servo step motor and PZT actuator.

In accordance with yet another aspect of the present invention, besides the first supporting member being formed of a material having ultra low CTE, the second supporting member being formed of a material having a negative CTE and the tuning means for changing the dimension of the first supporting member substantially along the longitudinal direction, the supporting assembly of the optical fiber grating package further has a third supporting member being formed of a material having a negative CTE. The second supporting member and the third supporting member are bonded with the first supporting member respectively.

The first end and the second end of the fiber portion are fixed on the second and third supporting members respectively such that the optical characteristic of the grating is tunable by the tuning means, and effect of temperature fluctuations on the strain is substantially compensated by the second and third supporting members. The second supporting member and the third supporting members can have different negative CTE values.

In accordance with yet another aspect of the present invention, besides the first supporting member being formed of a material having ultra low CTE, the second supporting member being formed of a material having a negative CTE and the tuning means for changing the dimension of the first supporting member substantially along the longitudinal direction, the supporting assembly of the optical fiber grating package further has a third supporting member being formed of a material having a negative CTE.

The first supporting member, the second supporting member and the third supporting member are bonded together along the longitudinal direction with the first supporting member in the middle. The first end and the second end of the fiber portion are fixed on the second and third supporting members respectively such that the optical characteristic of the grating is tunable by the tuning means, and effect of temperature fluctuations on the strain is substantially compensated by the second and third supporting members. The second supporting member and the third supporting member can have different negative CTE values.

The above summary of the present invention is not intended to describe each disclosed embodiment or every implementation of the present invention. The figures and the detailed description will more particularly exemplify these embodiments.

While the invention is amendable to various modifications and alternative forms, specifies thereof have been shown by way of examples in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

Figure 1:
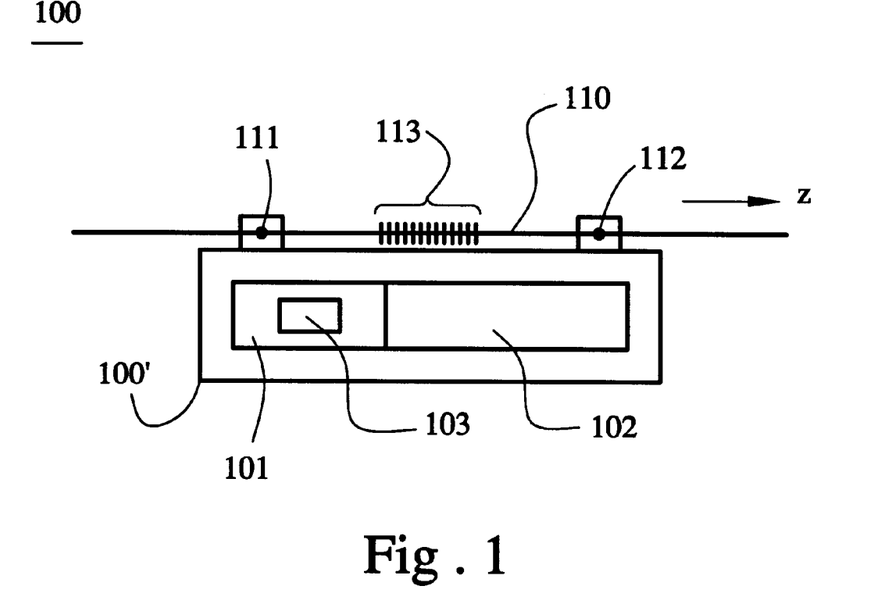
FIG. 1 is a schematic illustration of a tunable optical fiber grating package with low temperature dependency of the present invention.

FIG. 1 is a schematic illustration of a tunable optical fiber grating package with low temperature dependency of the present invention. In FIG. 1, the tunable optical fiber grating package 100 has a supporting assembly 100' and an optical fiber portion 110 having at least one grating 113 between a first end 111 and a second end 112 of the fiber portion 110. The first end 111 and the second end 112 of the fiber portion 110 define a longitudinal direction Z and the at least one grating 113 has an optical characteristic that varies with strain of the fiber portion 110. The supporting assembly 100' has a first supporting member 101 formed of a material having ultra low CTE, a second supporting member 102 formed of a material having a negative CTE and a tuning means 103 for changing the dimension of the first supporting member 101 substantially along the longitudinal direction Z.

The first supporting member 101 and the second supporting member 102 are bonded together. The first end 111 and the second end 112 of the fiber portion 110 are fixed on the supporting assembly 100' in such a manner that the optical characteristic of the grating is tunable by changing the dimension of the first supporting member 101 substantially along the longitudinal direction Z by the tuning means 103 and the effect of temperature fluctuations on the fiber portion 110 can be substantially compensated by the second supporting member 102.

The at least one grating 113 can be a plurality of fiber Bragg gratings. Each grating can be a grating selected from a group consisting of even-period grating and uneven-period grating. The optical characteristic can be a characteristic selected from a group consisting of a wavelength of a fiber Bragg grating, a resonant wavelength of Bragg gratings, a change in strain inducing a change in the resonant wavelength of in the fiber portion, and a change in strain within a predetermined range of strain.

Figure 2:
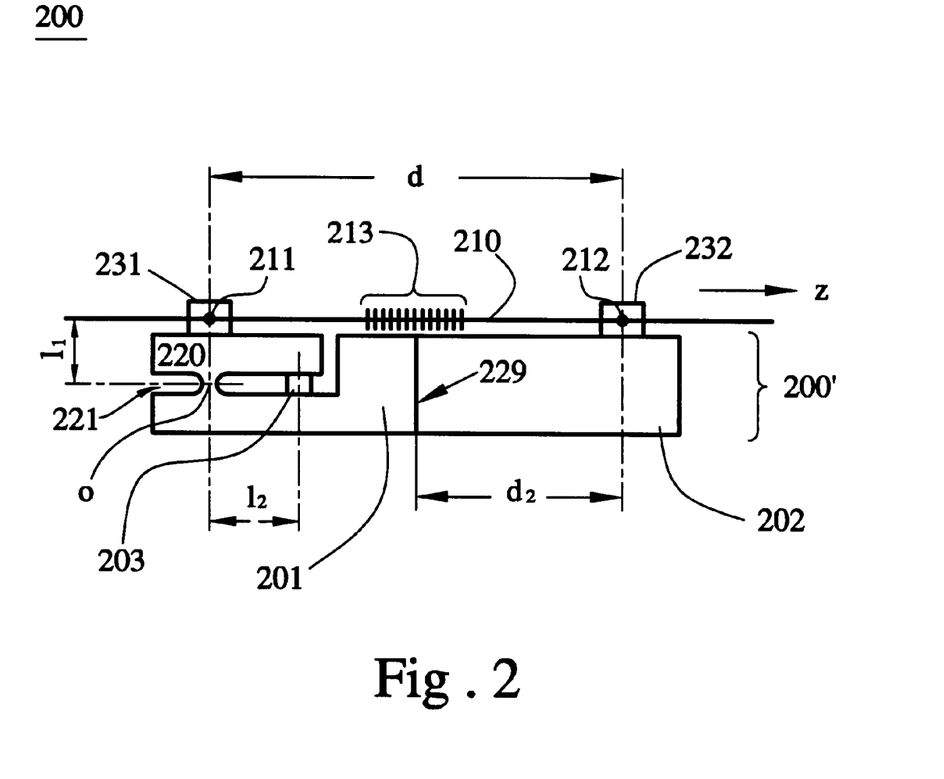
FIG. 2 shows an embodiment of a tunable optical fiber grating package with low temperature dependency of the present invention.

FIG. 2 shows an embodiment of a tunable optical fiber grating package 200 of the present invention. In FIG. 2, the tunable optical fiber grating package 200 has a supporting assembly 200' and an optical fiber portion 210 having at least one grating 213 between a first end 211 and a second end 212 of the fiber portion 210. The first end 211 and the second end 212 of the fiber portion 210 define a longitudinal direction Z and the at least one grating 213 has an optical characteristic that varies with strain of the fiber portion 210. The supporting assembly 200' has a first supporting member 201 formed of a material having ultra low CTE, e.g. invar, a second supporting member 202 formed of a material having a negative CTE, e.g. high negative CTE ceramic composite, and a tuning means, e.g. a PZT actuator 203, for changing the dimension of the first supporting member 201 substantially along the longitudinal direction Z.

In FIG. 2, 231 and 232 are first, and second fiber holders holding and fixing the first end 211 and second end 212 on the first supporting member 201 and second supporting member 202 respectively. The first supporting member 201 has an inverse magnification structure 220 with a joint 221. Point O is the revolving center of the joint 221. The first end 211 and point O are preferred to be substantially on a same line which is perpendicular to the direction Z.

If $l_1$ is the distance between the fiber portion 210 and point O and $l_2$ is the distance between point O and the central line of the PZT actuator 203, the mechanical advantage M of the inverse magnification structure 220 is $M=l_1/l_2<1$. In other words, if the PZT actuator changes its length for S, the first end 211 of the fiber portion will shift MS (revolve along point O) substantially along the direction Z. A PZT actuator with a working range of more than 150 μm is generally available and the absolute CTE value of a PZT actuator can now reach a value of as low as $(1-2)*10^{-6}/°$ C. So, if M is not larger than 0.5, the actuator-induced thermal longitudinal variation of the first supporting member 201 along the direction Z is smaller than $(0.5-1)*10^{-6}/°$ C. which is generally acceptable for most situations.

In one example of the embodiment as shown in FIG. 2, the grating 213 has 40000 periods with a substantially even period Λ of 0.5 μm. If $n_{eff}$ is 1.45, the working range of the PZT actuator 203 is 140 μm and M is 0.5, the change of Λ is about 1.7 nm and the wavelength tuning range of the package 200 is about 5 nm. If the working range of the PZT actuator 203 reaches 280 μm or more, the wavelength tuning range of the package can be larger than 10 nm. The wavelength tuning range of the package of this embodiment is sufficient for many applications, such as flexible optical add/drop multiplexing (OADM) system, dynamic dispersion compensator, fiber laser sources and so on.

The first supporting member 201 and the second supporting member 202 can have grooves for receiving the fiber portion. The absolute value of the ultra low CTE of the first supporting member 201 is smaller than $2*10^{-6}/°$ C. The second supporting member 202 can be made of ceramic composite with high negative CTE. The negative CTE of the second supporting member 202 is substantially between $-7*10^{-6}/°$ C. to $-14*10^{-6}/°$ C. Exemplary high negative CTE materials are commercially available from Ohara Corporation, 23141 Arroyo Vista, Rancho Santa Margarita, Calif. 92688.

In FIG. 2, d is the distance of between the first end 211 and the second end 212 of the fiber portion and $d_2$ is a predetermined distance between the bonding surface 229 and the second end 212 of the fiber portion 210. Generally, $d_2$ can be decided according to the properties of the fiber portion 210 and the second supporting member 202. It is apparent to those skilled in the art that the larger the absolute CTE value of the second supporting member 202, the smaller the distance $d_2$ is required. Still referring to FIG. 2, the first supporting member 201 can have more than one inverse magnification structures and the tuning means can have more than one PZT actuators.

Figure 3:
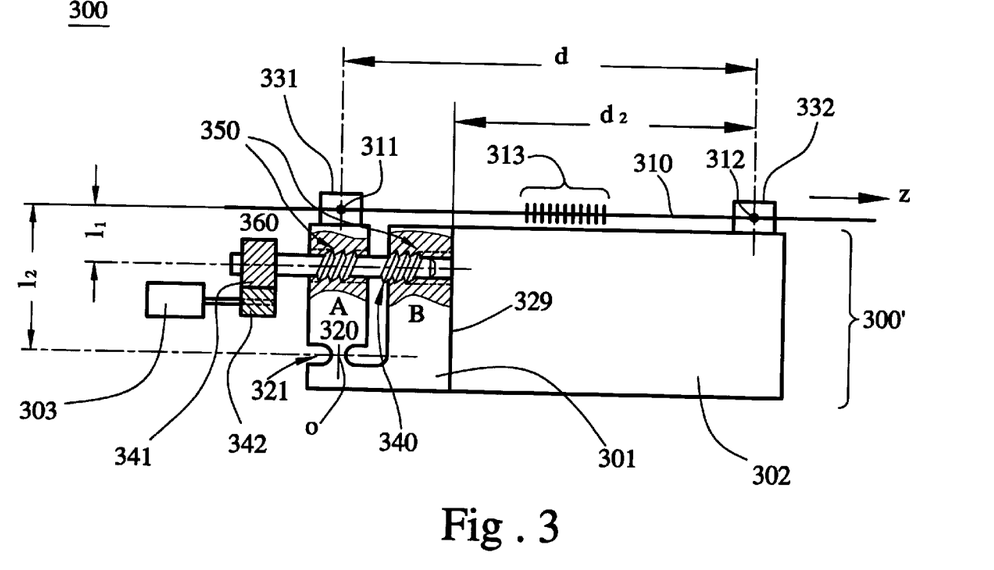
FIG. 3 shows another embodiment of a tunable optical fiber grating package with low temperature dependency of the present invention.

FIG. 3 shows another embodiment of the embodiment of a tunable optical fiber grating package 300 of the present invention. In FIG. 3, the tunable optical fiber grating package 300 has a supporting assembly 300' and an optical fiber portion 310 having at least one grating 313 between a first end 311 and a second end 312 of the fiber portion 310. The first end 311 and the second end 312 of the fiber portion 310 define a longitudinal direction Z and the at least one grating 313 has an optical characteristic that varies with strain of the fiber portion 310.

The supporting assembly 300' has a first supporting member 301 formed of a material having ultra low CTE, e.g. invar, a second supporting member 302 formed of a material having a negative CTE and a servo step motor 303 as a tuning means for changing the dimension of the first supporting member 301 substantially along the longitudinal direction Z.

In FIG. 3, 331 and 332 are first, and second fiber holders holding and fixing the first end 311 and second end 312 on the first supporting member 301 and second supporting member 302 respectively. The first supporting member 301 has a resilient structure 320 with a joint 321. Point O is the revolving center of the joint 321. The first end 311 and point O are preferred to be substantially on a same line which is perpendicular to the direction Z. The first supporting member 301 further has a differential screw structure 350 comprising a screw 340, a first thread hole A and a second thread hole B. Generally the pitches of the first thread hole A and the second thread hole B are slightly different and the screw 340 accordingly has a first part (in thread hole A) and a second part (in thread hole B) with slightly different pitches such that when the screw 340 revolves, the first end 311 of the fiber portion will shift (revolve along point O) substantially along the direction Z.

If $l_2$ is the distance between the fiber portion 310 and point O and $l_1$ is the distance between the fiber portion 310 and the central line of the screw 340, the mechanical advantage M of the resilient structure 320 is $M=l_2/(l_2-l_1)>1$. In other words, if the relative position of the first thread hole A and the second thread hole B changes S along the central line of the screw 340, the first end 311 of the fiber portion will shift MS (revolve with respective to point O) substantially along the Direction Z. The screw 340 is also made of ultra low CTE material, e.g. invar. So, the first supporting member 301 has a very low temperature dependency.

In one example of the embodiment as shown in FIG. 3, the grating 313 has 40000 periods with a substantially even period Λ of 0.5 μm. If $n_{eff}$ is 1.45 and M is 1.5, total working range of the screw 340 is 20 revolutions and the pitch difference of the first part (in thread hole A) and the second part (in thread hole B) of the screw 340 is 10 μm, the wavelength tuning range of the package 300 is about 21 nm. The wavelength tuning range of the package of this embodiment is sufficient for most applications. It, is apparent to those skilled in the art that the wavelength tuning range of the package 300 can be larger than 21 nm by adjusting the structure parameters of the first supporting member 301. For example, if the pitch differences of the first part (in thread hole A) and the second part (in thread hole B) of the screw 340 is 20 μm, the wavelength tuning range of the package 300 can be raised to about 42 nm. In this example, the resilient structure 320 is a magnification structure with a mechanical advantage of 1.5.

The screw 340 can be driven by the servo step motor 303 directly. The supporting assembly 300' can also have a worm/worm wheel subassembly 360 having a worm wheel 341 and a worm 342 disposed between the screw 340 and the servo step motor 303 which can substantially raise the tuning resolution of the package 3,00. Other mechanical system similar to a worm/worm wheel subassembly 360 can also be used in the embodiment.

The first supporting member 301 and the second supporting member 302 can have grooves for receiving the fiber portion. The absolute value of the ultra low CTE of the first supporting member 301 is smaller than $2*10^{-6}/°$ C. The second supporting member 302 can be made of ceramic composite with high negative CTE or other similar materials. The negative CTE of the second supporting member 302 is substantially between $-7*10^{-6}/°$ C. to $--14*10^{-6}/°$ C.

In FIG. 3, d is the distance of between the first end 311 and the second end 312 of the fiber portion and $d_2$ is a predetermined distance between the bonding surface 329 and the second end 312 of the fiber portion 310. Generally, $d_2$ can be decided according to the properties of the fiber portion 310 and the second supporting member 302. It is apparent to those skilled in the art that the larger the absolute CTE value of the second supporting member 302, the smaller the distance $d_2$ is required. Still referring to FIG. 3, the first supporting member 301 can have more than one resilient structure and the tuning means can have more than one servo step motor.

It is apparent to those skilled in the art that the differential screw structure 350 is not necessarily disposed parallel to the longitudinal direction Z as shown in FIG. 3. The screw structure 350 can also be disposed perpendicular to the longitudinal direction Z or along other directions. For example, the PZT actuator 203 in FIG. 2 can be replaced by a differential screw structure driven by a servo step motor as shown in FIG. 3. Under this situation, the differential screw structure works with an inverse magnification structure with a mechanical advantage smaller than 1.

Figure 4:
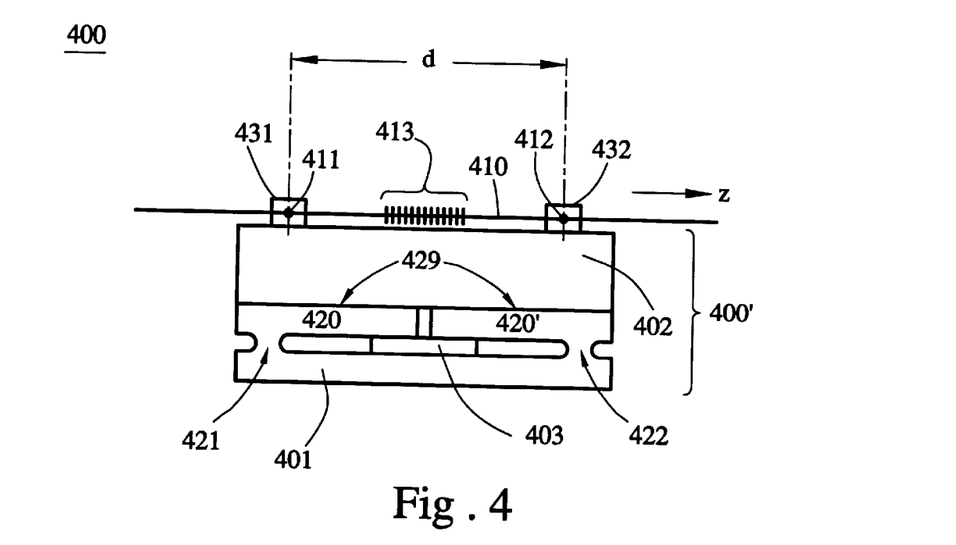
FIG. 4 shows another embodiment of a tunable optical fiber grating package with low temperature dependency of the present invention.

FIG. 4 shows another embodiment of a tunable optical fiber grating package 400 of the present invention. In FIG. 4, the tunable optical fiber grating package 400 has a supporting assembly 400' and an optical fiber portion 410 having at least one grating 413 between a first end 411 and a second end 412 of the fiber portion 410. The first end 411 and the second end 412 of the fiber portion 410 define a longitudinal direction Z and the at least one grating 413 has an optical characteristic that varies with strain of the fiber portion 410. The supporting assembly 400' has a first supporting member 401 formed of a material having ultra low CTE, e.g. invar, a second supporting member 402 formed of a material having a negative CTE and a tuning means 403 for changing the dimension of the first supporting member 401 substantially along the longitudinal direction Z. The first supporting member 401 and the second supporting member 402 are bonded together through a bonding surface 429.

In FIG. 4, 431 and 432 are first, and second fiber holders holding and fixing the first end 411 and second end 412 on the second supporting member 402. The first supporting member 401 has a twin inverse magnification structure 420/420' with a first joint 421 and a second joint 422. The total mechanical advantage M of the twin inverse magnification structure 420/420' is preferably not larger than ½. A PZT actuator with a working range of more than 150 $\mu$m is generally available and the CTE of a PZT actuator can now reach a value of about $(1-2)*10^{-6}/°$ C. So, if M is not larger that 0.5, the longitudinal variation of the first supporting member 401 along the direction Z is smaller than $(0.5-1)*10^{-6}/°$ C. which is generally acceptable in most applications.

The second supporting member 402 can have grooves for receiving the fiber portion 410. The absolute value of the ultra low CTE of the first supporting member 401 is small than $2*10^{-6}/°$ C. The second supporting member 402 can be made of ceramic composite with high negative CTE or other similar materials. The negative CTE of the second supporting member 402 is substantially between $-7*10^{-6}/°$ C. to $14*10^{-6}/°$ C.

In FIG. 4, d is the distance of between the first end 411 and the second end 412. Generally, d can be generally decided according to the property of the fiber portion 410, the property of second supporting member 402 and the bonding condition between the first supporting member 401 and the second supporting member 402. Still referring to FIG. 4, the tuning means 403 can have more than one PZT actuators.

Instead of having a twin inverse magnification structure, the first supporting member 401 can also have a spiral power spring extending out substantially along the longitudinal direction from the first supporting member. A multi-position ratchet wheel subassembly can be used as a tuning means for winding the spiral power spring. This multi-position ratchet wheel subassembly can be driven manually or by a servo step motor.

It is apparent to those skilled in the art that the first supporting member 201 and the tuning means 203 of FIG. 2, the first supporting member 301 and the tuning means 303 of FIG. 3 and their equivalents can also be used in this embodiment.

Figure 5:
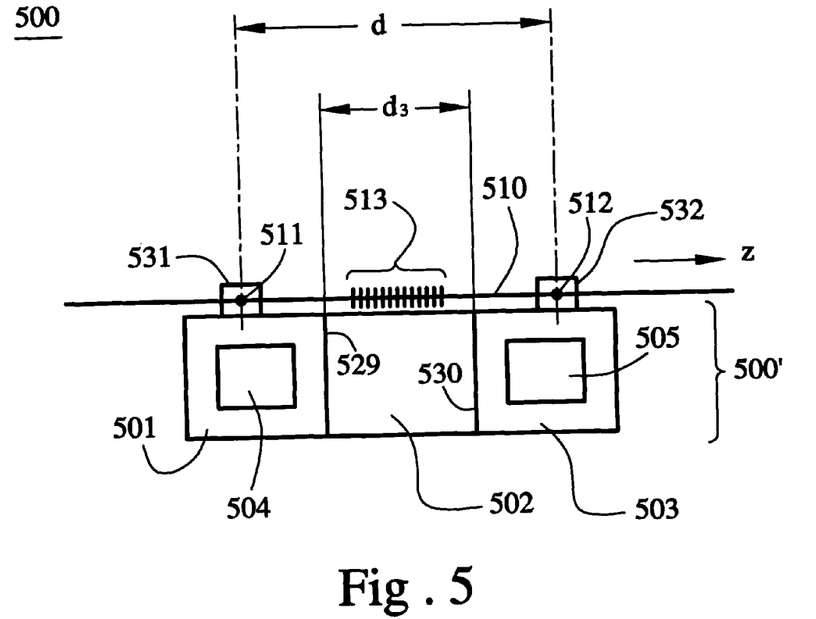
FIG. 5 shows yet another embodiment of a tunable optical fiber grating package with low temperature dependency of the present invention.

FIG. 5 shows another embodiment of a tunable optical fiber grating package 500 of the present invention. In FIG. 5, the tunable optical fiber grating package 500 has a supporting assembly 500' and an optical fiber portion 510 having at least one grating 513 between a first end 511 and a second end 512 of the fiber portion 510. The first end 511 and the second end 512 of the fiber portion 510 define a longitudinal direction Z and the at least one grating 513 has an optical characteristic that varies with strain of the fiber portion 510. The supporting assembly 500' has a first supporting member 501 formed of a material having ultra low CTE, a third supporting member 503 formed of a material having ultra low CTE, and a second supporting member 502 formed of a material having a negative CTE. The supporting assembly 500' further has a first tuning means 504 for changing the dimension of the first supporting member 501 substantially along the longitudinal direction Z and a second tuning means 505 for changing the dimension of the third supporting member 503 substantially along the longitudinal direction z.

In FIG. 5, d is the distance of between the first end 511 and the second end 512 and $d_3$ is the length of the second supporting member 502. Generally, $d_3$ can be decided according to the properties of the fiber portion 510 and the second supporting member 502. It is apparent to those skilled in the art that the larger the absolute CTE value of the second supporting member 502, the smaller the distance $d_3$ is required.

The first supporting member 501, the second supporting member 502 and the third supporting member 503 are bonded together through bonding surfaces 529, 530 as shown in FIG. 5. The first end 511 and the second end 512 of the fiber portion 510 are fixed on the first supporting member 501 and the third supporting member 503 respectively such that the optical characteristic of the grating is tunable by changing the dimensions of the first and third supporting members 501, 503 substantially along the longitudinal direction Z by the first and second tuning means 504, 505 and the effect of temperature fluctuations on the fiber portion 510 can be substantially compensated by the second supporting member 502 disposed in the middle of the first and third supporting members 501 and 503.

The first, second and third supporting members 501, 502 and 503 can have grooves for receiving the fiber portion 510. The absolute value of the ultra low CTE of the first and third supporting members 501, 503 are small than $2*10^{-6}/°$ C. The second supporting member 502 can be made of ceramic composite with high negative CTE. The negative CTE of the second supporting member 502 is substantially between $-7*10^{-6}/°$ C. to $-14*10^{-6}/°$ C. In FIG. 5, 531 and 532 are first, and second fiber holders holding and fixing the first end 511 and the second end 512.

Similarly, it is apparent to those skilled in the art that the first supporting member 201 and the tuning means 203 of FIG. 2, the first supporting member 301 and the tuning means 303 of FIG. 3, the first supporting member 401 and the tuning means 403 of FIG. 4, and their equivalents can also be used in this embodiment as the first supporting members 501, the third supporting members and 503 and their corresponding first and second tuning means 504, 505.

As there are two tunable structures and two tuning means 504, 505 in the package of this embodiment, the wavelength tuning range can be at least doubled compared with other embodiments of the present invention.

In FIG. 5, the first tuning means 504 can be same as the second tuning means 505, e.g. a PZT actuator. The first tuning means 504 can also be different from the second tuning means 505, e.g. one PZT actuator and another servo step motor. In one example of this embodiment, the first supporting member 501 further has an inverse magnification structure (mechanical advantage smaller than 1) for fine-tuning and the third supporting member 503 has a magnification structure (mechanical advantage larger than 1) for larger scale tuning. The package of this example can substantially raise the wavelength tuning range and wavelength tuning resolution.

It should be noted that the first, second and third supporting members 501, 502 and 503 are not necessarily cascaded together along the direction Z. Instead, the first and third supporting members 502, 503 can also be fixed on one side of the second supporting member 502.

Figure 6:
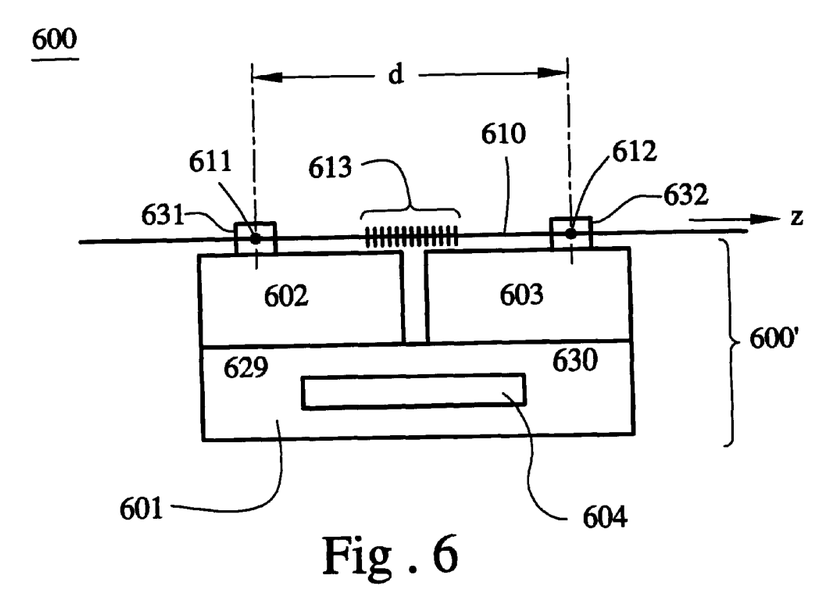
FIG. 6 shows yet another embodiment of a tunable optical fiber grating package with low temperature dependency of the present invention.

FIG. 6 shows another embodiment of a tunable optical fiber grating package 600 of the present invention. In FIG. 6, the tunable optical fiber grating package 600 has a supporting assembly 600' and an optical fiber portion 610 having at least one grating 613 between a first end 611 and a second end 612 of the fiber portion 610. The first end 611 and the second end 612 of the fiber portion 610 define a longitudinal direction Z and the at least one grating 613 has an optical characteristic that varies with strain of the fiber portion 610.

The supporting assembly 600' has a first supporting member 601 formed of a material having ultra low CTE, a second supporting member 602 formed of a material having a negative CTE, and a third supporting member 603 formed of a material having a negative CTE. The supporting assembly 600' further has a tuning means 604 for changing the dimension of the first supporting member 601 substantially along the longitudinal direction Z. In FIG. 6, d is the distance of between the first end 611 and the second end 612. Generally, d can be decided according to the properties of the fiber portion 610 and the second and third supporting members 602, 603 and the bond conditions between the first supporting member 601 and the second, third supporting members 602, 603.

The second supporting member 602 and the third supporting member 603 are bonded respectively with first supporting member 601 through bonding surfaces 629, 630 as shown in FIG. 6. The first end 611 and the second end 612 of the fiber portion 610 are fixed on the second supporting member 602 and the third supporting member 603 such that the optical characteristic of the grating is tunable by changing the dimensions of the first supporting members 601 substantially along the longitudinal direction Z by the tuning means 604 and the effect of temperature fluctuations on the fiber portion 610 can be substantially compensated by the second and third supporting members 602, 603.

The second and third supporting members 602 and 603 can have grooves for receiving the fiber portion 610. The absolute value of the ultra low CTE of the first supporting member 601 is small than $2*10^{-6}/°$ C. The second and third supporting members 602, 603 can be made of ceramic composite with high negative CTE. The negative CTE values of the second and third supporting members 602, 603 are substantially between $-7*10^{-6}/°$ C. to $-14*10^{-6}/°$ C. The negative CTE values of the second and third supporting members 602, 603 should not necessarily be considered same. They can be different to each other and cooperatively work together to reach precise compensation. In FIG. 6, 631 and 632 are first, and second fiber holders holding and fixing the first end 611 and second end 612.

Similarly, it is apparent to those skilled in the art that the first supporting member 201 and the tuning means 203 of FIG. 2, the first supporting member 301 and the tuning means 303 of FIG. 3, the first supporting member 401 and the tuning means 403 of FIG. 4, and their equivalents can also be used in this embodiment as the first supporting members 601 and its corresponding tuning means 604.

Figure 7:
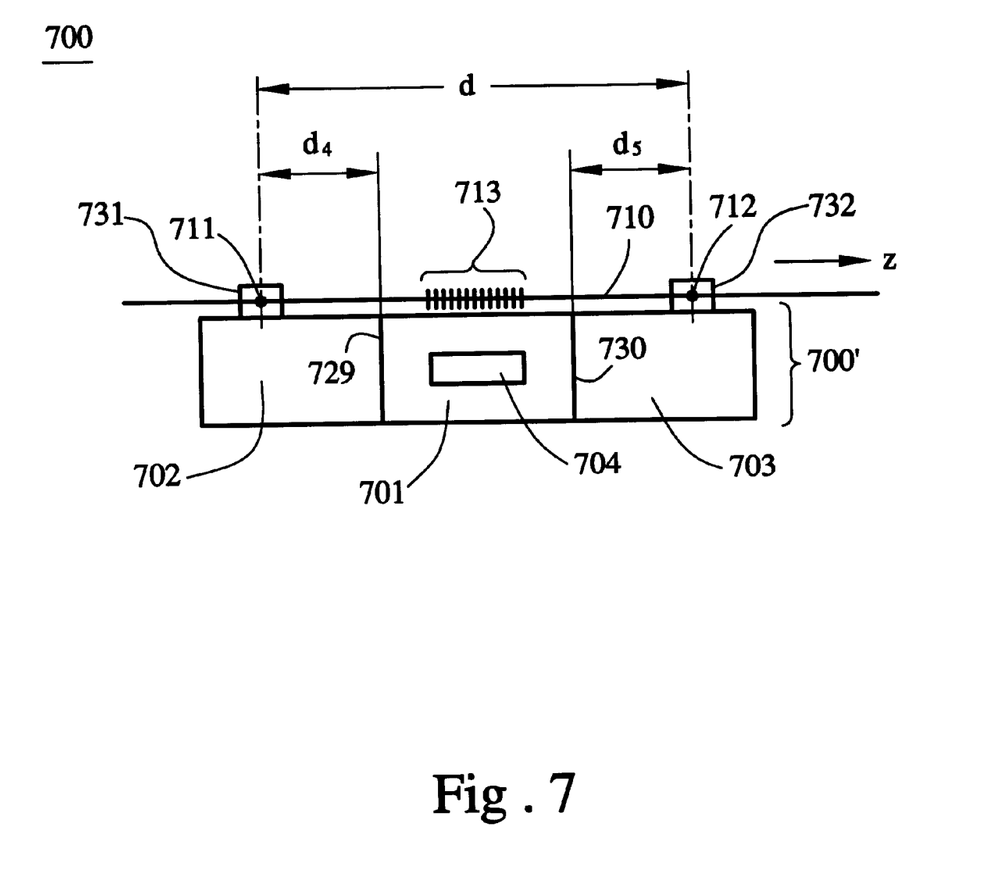
FIG. 7 shows yet another embodiment of a tunable optical fiber grating package with low temperature dependency of the present invention.

FIG. 7 shows another embodiment of a tunable optical fiber grating package 700 of the present invention. In FIG. 7, the tunable optical fiber grating package 700 has a supporting assembly 700' and an optical fiber portion 710 having at least one grating 713 between a first end 711 and a second end 712 of the fiber portion 710. The first end 711 and the second end 712 of the fiber portion 710 define a longitudinal direction Z and the at least one grating 713 has an optical characteristic that varies with strain of the fiber portion 710.

The supporting assembly 700' has a first supporting member 701 formed of a material having ultra low CTE, a second supporting member 702 formed of a material having a negative CTE, and a third supporting member 703 formed of a material having a negative CTE. The supporting assembly 700' further has a tuning means 704 for changing the dimension of the first supporting member 701 substantially along the longitudinal direction Z.

In FIG. 7, d is the distance of between the first end 711 and the second end 712, $d_4$ is the distance between the first end 711 and first bonding surface 729, and $d_5$ is the distance between the second end 712 and second bonding surface 730. Generally, d can be decided according to the properties of the fiber portion 710 and the second and third supporting members 702, 703. It is apparent to those skilled in the art that the larger the absolute CTE value of the second and third supporting members 702, 703, the smaller the distance $d_4$ and $d_5$ are required.

The first supporting member 701, the second supporting member 702 and the third supporting member 703 are bonded together through first and second bonding surfaces 729, 730 as shown in FIG. 7. The first end 711 and the second end 712 of the fiber portion 710 are fixed on the second supporting member 702 and the third supporting member 703 such that the optical characteristic of the grating is tunable by changing the dimensions of the first supporting members 701 substantially along the longitudinal direction Z by the tuning means 704 and the effect of temperature fluctuations on the fiber portion 710 can be substantially compensated by the first supporting member 701 disposed in the middle of the second and third supporting members 702 and 703.

The first, second and third supporting members 701, 702 and 703 can have grooves for receiving the fiber portion 710. The absolute value of the ultra low. CTE of the first supporting members 701 is small than $2*10^{-6}/°$ C. The second and third supporting members 702, 703 can be made of ceramic composite with high negative CTE. The negative CTE of the second and third supporting members 702, 703 are substantially between $-7*10^{-6}/°$ C. to $-14*10^{-6}/°$ C.; In FIG. 7, 731 and 732 are first, and second fiber holders holding and fixing the first end 711 and second end 712.

Similarly, it is apparent to those skilled in the art that the first supporting member 201 and the tuning means 203 of FIG. 2 the first supporting member 301 and the tuning means 303 of FIG. 3, the first supporting member 401 and the tuning means 403 of FIG. 4, and their equivalents can also be used in this embodiment as the first supporting members 701 and its corresponding tuning means 704.

In FIG. 7, the negative CTE values of the second and third supporting members 702, 703 should not necessarily be considered same. They can be different to each other and cooperatively work together to reach precise compensation.

Also, it is obvious to those skilled in the art that any PZT actuator or step motor used in the present invention needs corresponding controlling device and power supplying device necessary for fulfilling the present invention. The tuning means of the present invention is not limited to PZT actuator and servo step motor. Any tuning means familiar to those skilled in the art can be used in the present invention. The fiber holders used in the present invention can be any form of fiber holders familiar to those skilled in the art, even as simple as a drop or a layer of glue.

The tunable optical fiber grating package of the present invention can reach a wavelength tuning range generally between 5 nm to 80 nm and a temperature dependency as low as (0.5–1) pm/° C.

The present invention should not be considered limited to the particular examples described above, but rather should be understood to cover all aspects of the present invention as fairly set out in the attached claims. Various modifications, equivalents, as well as numerous geometrical configurations to which the present invention may be applicable will be readily apparent to those of skill in the art to which the present invention is directed upon review of the present specification.

What is claimed is:

1. An optical fiber grating package comprising:
    an optical fiber portion having at least one grating between a first end and a second end of said fiber portion, said first end and said second end defining a longitudinal direction, said grating having an optical characteristic which varies with strain of said fiber portion; and
    a supporting assembly comprising:
        a first supporting member being formed of a material having ultra low CTE;
        a second supporting member being formed of a material having a negative CTE; and
        a first tuning means for changing the dimension of said first supporting member substantially along said longitudinal direction;
    wherein said first supporting member and said second supporting member are bonded together, said first end and said second end of said fiber portion are fixed on said supporting assembly such that said optical characteristic of said grating is tunable by said first tuning means and effect of temperature fluctuations on said strain is substantially compensated by said second supporting member.

2. The optical fiber grating package of claim 1, wherein said at least one grating comprises a plurality of fiber Bragg gratings.

3. The optical fiber grating package of claim 1, wherein each said grating is an uneven-period grating.

4. The optical fiber grating package of claim 1, wherein said optical characteristic is a resonant wavelength of Bragg gratings.

5. The optical fiber grating package of claim 1, wherein said first end is fixed on said first supporting member and said second end is fixed on said second supporting member.

6. The optical fiber grating package of claim 5, wherein said first supporting member comprises an inverse magnification structure having a mechanical advantage smaller than 1 which transfers a displacement of said first tuning means into a change in strain of said fiber portion.

7. The optical fiber grating package of claim 6, wherein said mechanical advantage is smaller than ½.

8. The optical fiber grating package of claim 5, wherein said first supporting member comprises a first fiber holder for fixing said first end of said fiber portion, said second supporting member comprises a second fiber holder for fixing said second end of said fiber portion.

9. The optical fiber grating package of claim 5, wherein the absolute value of said ultra low CTE of said first supporting member is smaller than $2*10^{-6}$/° C.

10. The optical fiber grating package of claim 5, wherein said first supporting member is made of invar.

11. The optical fiber grating package of claim 5, wherein said negative CTE of said second supporting member is substantially between $-7*10^{-6}$/° C. to $-14* 10^{-6}$/° C.

12. The optical fiber grating package of claim 5, wherein said second supporting member comprises ceramic composite.

13. The optical fiber grating package of claim 5, wherein said second supporting member supports a predetermined portion of said fiber portion between said first end and said second end of said fiber portion.

14. The optical fiber grating package of claim 5, wherein said first tuning means comprises a PZT actuator.

15. The optical fiber grating package of claim 14, wherein the absolute CTE value of said PZT actuator is not larger than $2*10^{-6}$/° C.

16. The optical fiber grating package of claim 5, wherein said first tuning means comprises a servo step motor.

17. The optical fiber grating package of claim 5, wherein said first supporting member comprises a differential screw structure which is made of same material as that of said first supporting member.

18. The optical fiber grating package of claim 17, wherein said first supporting member further comprises a worm/worm wheel subassembly.

19. The optical fiber grating package of claim 1, wherein said first end and said second end are fixed on said second supporting member.

20. The optical fiber grating package of claim 19, wherein said first supporting member comprises an inverse magnification structure having a mechanical advantage smaller than 1 which transfers a displacement of said tuning means into a change in strain of said fiber portion.

21. The optical fiber grating package of claim 20, wherein said mechanical advantage is smaller than ½.

22. The optical fiber grating package of claim 19, wherein said second supporting member comprises a first fiber holder for fixing said first end of said fiber portion and a second fiber holder for fixing said second end of said fiber portion.

23. The optical fiber grating package of claim 19, wherein the absolute value of said ultra low CTE of said first supporting member is smaller than $2* 10^{-6}$/° C.

24. The optical fiber grating package of claim 19, wherein said first supporting member is made of invar.

25. The optical fiber grating package of claim 19, wherein said CTE of said second supporting member is substantially between $-7* 10^{-6}$/° C. to $-14* 10^{-6}$/° C.

26. The optical fiber grating package of claim 19, wherein said second supporting member comprises ceramic composite.

27. The optical fiber grating package of claim 19, wherein said first tuning means comprises a PZT actuator.

28. The optical fiber grating package of claim 27, wherein the absolute CTE value of said PZT actuator is not larger than $2*10^{-6}$/° C.

29. The optical fiber grating package of claim 19, wherein said first tuning means comprises a servo step motor.

30. The optical fiber grating package of claim 19, wherein said first supporting member comprises a differential screw structure which is made of same material as that of said first supporting member.

31. The optical fiber grating package of claim 30, wherein said first supporting member further comprises a worm/worm wheel subassembly.

32. An optical fiber grating package of claim 1, wherein said supporting assembly further comprising:
- a third supporting member being formed of a material having ultra low CTE; and
- a second tuning means for changing the dimension of said third supporting member substantially along said longitudinal direction;

wherein said first supporting member, said third supporting member are bonded with said second supporting member respectively, said first end and said second end of said fiber portion are fixed on said first and third supporting members respectively such that said optical characteristic of said grating is tunable by said first tuning means and said second tuning means, and effect of temperature fluctuations on said strain is substantially compensated by said second supporting member.

33. The optical fiber grating package of claim 32, wherein each of said first tuning means and said second tuning means comprises a tuning means selected from a group consisting of servo step motor and PZT actuator.

34. An optical fiber grating package of claim 1, wherein said supporting assembly further comprising:
- a third supporting member being formed of a material having ultra low CTE; and
- a second tuning means for changing the dimension of said third supporting member substantially along said longitudinal direction;

wherein said first supporting member, said second supporting member and said third supporting member are bonded together along said longitudinal direction with said second supporting member in the middle, said first end and said second end of said fiber portion are fixed on said first and third supporting members respectively such that said optical characteristic of said grating is tunable by said first tuning means and said second tuning means, and effect of temperature fluctuations on said strain is substantially compensated by said second supporting member.

35. The optical fiber grating package of claim 34, wherein each of said first tuning means and said second tuning means comprises a tuning means selected from a group consisting of servo step motor and PZT actuator.

36. An optical fiber grating package of claim 1, wherein said supporting assembly further comprising:
- a third supporting member being formed of a material having a negative CTE; wherein said second supporting member and said third supporting member are bonded with said first supporting member respectively, said first end and said second end of said fiber portion are fixed on said second and third supporting members respectively such that said optical characteristic of said grating is tunable by said first tuning means, and effect of temperature fluctuations on said strain is substantially compensated by said second supporting member.

37. The optical fiber grating package of claim 36, wherein said second supporting member and said third supporting member have different negative CTE values.

38. An optical fiber grating package of claim 1, wherein said supporting assembly further comprising:
- a third supporting member being formed of a material having ultra low CTE;

wherein said first supporting member, said second supporting member and said third supporting member are bonded together along said longitudinal direction with said first supporting member in the middle, said first end and said second end of said fiber portion are fixed on said second and third supporting members respectively such that said optical characteristic of said grating is tunable by said first tuning means, and effect of temperature fluctuations on said strain is substantially compensated by said second supporting member.

39. The optical fiber grating package of claim 38, wherein said second supporting member and said third supporting member have different negative CTE values.

* * * * *